United States Patent
Singh et al.

(10) Patent No.: US 12,192,669 B2
(45) Date of Patent: Jan. 7, 2025

(54) AUTO FOCUS ON SPEAKER DURING MULTI-PARTICIPANT COMMUNICATION CONFERENCING

(71) Applicant: Avaya Management L.P., Durham, NC (US)

(72) Inventors: Prateek Singh, Noida (IN); Divyarajsinh Jadeja, Pune (IN); Mittali Jangid, Gujarat (IN); Dean Beightol, Superior, CO (US)

(73) Assignee: Avaya Management L.P., Durham, NC (US)

(*) Notice: Subject to any disclaimer, the term of this patent is extended or adjusted under 35 U.S.C. 154(b) by 83 days.

(21) Appl. No.: 17/835,120

(22) Filed: Jun. 8, 2022

(65) Prior Publication Data
US 2023/0403366 A1    Dec. 14, 2023

(51) Int. Cl.
| | |
|---|---|
| H04N 5/262 | (2006.01) |
| G06V 20/40 | (2022.01) |
| G06V 40/16 | (2022.01) |
| G06V 40/20 | (2022.01) |
| G10L 17/06 | (2013.01) |
| G10L 25/57 | (2013.01) |
| H04L 65/403 | (2022.01) |

(52) U.S. Cl.
CPC .......... H04N 5/2628 (2013.01); G06V 20/40 (2022.01); G06V 40/161 (2022.01); G06V 40/172 (2022.01); G06V 40/20 (2022.01); G10L 17/06 (2013.01); G10L 25/57 (2013.01); H04L 65/403 (2013.01)

(58) Field of Classification Search
CPC ............. H04N 5/2628; G06V 40/172; G06V 40/161; G06V 20/40; G06V 40/20; G06L 17/06; G06L 25/57; H04L 65/403
USPC ...................................... 348/14.08
See application file for complete search history.

(56) References Cited

U.S. PATENT DOCUMENTS

| | | | |
|---|---|---|---|
| 7,460,150 B1 | 12/2008 | Coughlan et al. | |
| 10,257,465 B2 | 4/2019 | Tangeland et al. | |
| 10,846,522 B2* | 11/2020 | Chaudhuri | G06N 3/08 |
| 11,582,519 B1* | 2/2023 | Bhat | H04N 21/4666 |
| 11,611,600 B1* | 3/2023 | Ifrach | H04L 65/403 |
| 11,914,691 B2* | 2/2024 | Zhao | G06V 40/16 |
| 2013/0162752 A1* | 6/2013 | Herz | H04N 7/15 348/E7.083 |
| 2015/0088515 A1* | 3/2015 | Beaumont | G10L 17/06 704/251 |

(Continued)

*Primary Examiner* — Binh Kien Tieu
(74) *Attorney, Agent, or Firm* — Sheridan Ross P.C.

(57) ABSTRACT

A method for auto focus on a speaker during a communication session includes receiving video captured of a scene that includes a plurality of images of participants to the communication session, identifying the plurality of images of the participants in the video captured of the scene, recognizing audio from at least one of the participants, detecting facial movement in one of the images of the plurality of images and equating the recognized audio to the detected movement in the one of the images of the plurality of images. The method also includes selecting the one of the images of the plurality of images as a speaker based on the equated recognized audio to the detected movement in the one of the images, zooming in on the speaker and filtering out a remainder of the images of the plurality of images.

20 Claims, 9 Drawing Sheets

(56) References Cited

U.S. PATENT DOCUMENTS

| | | | |
|---|---|---|---|
| 2016/0134838 A1* | 5/2016 | Tangeland | H04N 7/152 348/14.09 |
| 2016/0173821 A1* | 6/2016 | De Magalhaes | H04N 23/61 348/14.08 |
| 2020/0211561 A1* | 7/2020 | Degraye | G10L 15/26 |
| 2021/0327423 A1* | 10/2021 | Dudley | G10L 25/57 |
| 2023/0262317 A1* | 8/2023 | O'Leary | H04L 65/1069 |
| 2023/0351727 A1* | 11/2023 | Balavalikar Krishnamurthy | H04N 5/2628 |

\* cited by examiner

AUTO FOCUS ON SPEAKER DURING MULTI-PARTICIPANT COMMUNICATION CONFERENCING

FIELD

The present disclosure relates generally to systems and methods for multi-participant communication conferencing and particularly relates to systems and methods for auto focusing on a speaker during multi-participant communication conferencing.

BACKGROUND

As offices start reopening after being closed for the last couple of years, a problem arises where some employees still work remotely while other employees work locally (i.e., coming into the office or gathering at a common meeting place). When conducting multi-participant communication conferencing where more than one participant is at the same location using a single communication device, the view at this location is that of all of the participants. In other words, the view at the location shows speakers and non-speakers of the communication session. Therefore, even if one of the participants is speaking and the other participants are either listening to the discussion during the communication session or engaging in activities unrelated to the communication session (e.g., checking mobile devices or participating in unrelated discussions) the view at the location is still of all of the participants. These unrelated activities may cause disturbances or distractions for the other participants involved in the multi-participant communication conferencing.

One conventional technique used to address this issue involves zooming in on the participant that is speaking. This technique, however, does not address the issue of background noise being generated when the other participants are engaging in unrelated discussions. Another technique used to address this issue involves blurring out the background when one of the participants starts speaking. This technique also does not address the issue of background noises being generated when the other participants are engaging in unrelated discussions.

Therefore, there is a need for systems and methods for auto focusing on a speaker during multi-participant communication conferencing by matching both a speaker's image and voice information with registered facial and voice prints using Artificial Intelligence (AI) and filtering out the image and voice information from the other participants.

SUMMARY

These and other needs are addressed by the various embodiments and configurations of the present disclosure. The present disclosure can provide a number of advantages depending on the particular configuration. These and other advantages will be apparent from the disclosure contained therein.

The phrases "at least one", "one or more", and "and/or" are open-ended expressions that are both conjunctive and disjunctive in operation. For example, each of the expressions "at least one of A, B and C", "at least one of A, B or C", "one or more of A, B and C", "one or more of A, B or C" and "A, B and/or C" means A alone, B alone, C alone, A and B together, A and C together, B and C together or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "conference" as used herein refers to any communication or set of communications, whether including audio, video, text or other multimedia data, between two or more communication endpoints and/or users. Typically, a conference includes two or more communication endpoints. The terms "conference" and "conference call" are used interchangeably throughout the specification.

The term "communication device" or "communication endpoint" as used herein refers to any hardware device and/or software operable to engage in a communication session. For example, a communication device can be an Internet Protocol (IP)-enabled phone, a desktop phone, a cellular phone, a personal digital assistant, a soft-client telephone program executing on a computer system, etc. IP-capable hard- or softphone can be modified to perform the operations according to embodiments of the present disclosure.

The term "network" as used herein refers to a system used by one or more users to communicate. The network can consist of one or more session managers, feature servers, communication endpoints, etc. that allow communications, whether voice or data, between two users. A network can be any network or communication system as described in conjunction with FIG. 1. Generally, a network can be a Local Area Network (LAN), a Wide Area Network (WAN), a wireless LAN, a wireless WAN, the Internet, etc that receives and transmits messages or data between devices. A network may communicate in any format or protocol known in the art, such as, Transmission Control Protocol/IP (TCP/IP), 802.11g, 802.11n, Bluetooth or other formats or protocols.

The term "communication event" and its inflected forms includes: (i) a voice communication event, including but not limited to a voice telephone call or session, the event being in a voice media format or (ii) a visual communication event, the event being in a video media format or an image-based media format or (iii) a textual communication event, including but not limited to instant messaging, internet relay chat, e-mail, short-message-service, Usenet-like postings, etc., the event being in a text media format or (iv) any combination of (i), (ii), and (iii).

The term "communication system" or "communication network" and variations thereof, as used herein, can refer to a collection of communication components capable of one or more of transmission, relay, interconnect, control or otherwise manipulate information or data from at least one transmitter to at least one receiver. As such, the communication may include a range of systems supporting point-to-point or broadcasting of the information or data. A communication system may refer to the collection of individual communication hardware as well as the interconnects associated with and connecting the individual communication hardware. Communication hardware may refer to dedicated communication hardware or may refer to a processor coupled with a communication means (i.e., an antenna) and running software capable of using the communication means to send and/or receive a signal within the communication system. Interconnect refers to some type of wired or wireless communication link that connects various components, such as communication hardware, within a communication system. A communication network may refer to a specific setup of a communication system with the collection of individual communication hardware and interconnects having some definable network topography. A communication network may include wired and/or wireless network having a pre-set to an ad hoc network structure.

The term "computer-readable medium" as used herein refers to any tangible storage and/or transmission medium that participate in providing instructions to a processor for execution. The computer-readable storage medium may be, for example, but not limited to, an electronic, magnetic, optical, electromagnetic, infrared or semiconductor system, apparatus or device or any suitable combination of the foregoing. More specific examples (a non-exhaustive list) of the computer-readable storage medium would include the following: an electrical connection having one or more wires, a portable computer diskette, a hard disk, etc. Such a medium may take many forms, including but not limited to, non-volatile media, volatile media and transmission media. Non-volatile media includes, for example, Non-Volatile Random-Access Memory (NVRAM) or magnetic or optical disks. Volatile media includes dynamic memory, such as main memory. Common forms of computer-readable media include, for example, a floppy disk, a flexible disk, a hard disk, a magnetic tape or any other magnetic medium, magneto-optical medium, a Compact Disk-Read Only Memory (CD-ROM), any other optical medium, punch cards, a paper tape, any other physical medium with patterns of holes, a RAM, a Programmable ROM (PROM), an Erasable PROM (EPROM), a Flash-EPROM, a solid state medium like a memory card, any other memory chip or cartridge, a carrier wave as described hereinafter or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented and/or the like. Accordingly, the disclosure is considered to include a tangible storage medium or distribution medium and prior art-recognized equivalents and successor media, in which the software implementations of the present disclosure are stored.

A "computer readable signal" medium may include a propagated data signal with computer readable program code embodied therein, for example, in baseband or as part of a carrier wave. Such a propagated signal may take any of a variety of forms, including, but not limited to, electro-magnetic, optical or any suitable combination thereof. A computer readable signal medium may be any computer readable medium that is not a computer readable storage medium and that can communicate, propagate or transport a program for use by or in connection with an instruction execution system, apparatus or device. Program code embodied on a computer readable medium may be transmitted using any appropriate medium, including but not limited to wireless, wireline, optical fiber cable, Radio-frequency (RF), etc. or any suitable combination of the foregoing.

A "database" is an organized collection of data held in a computer. The data is typically organized to model relevant aspects of reality (for example, the availability of specific types of inventories), in a way that supports processes requiring this information (for example, finding a specified type of inventory). The organization schema or model for the data can, for example, be hierarchical, network, relational, entity-relationship, object, document, XML, entity-attribute-value model, star schema, object-relational, associative, multidimensional, multi-value, semantic and other database designs. Database types include, for example, active, cloud, data warehouse, deductive, distributed, document-oriented, embedded, end-user, federated, graph, hypertext, hypermedia, in-memory, knowledge base, mobile, operational, parallel, probabilistic, real-time, spatial, temporal, terminology-oriented and unstructured databases. Database management system (DBMS)s are specially designed applications that interact with the user, other applications, and the database itself to capture and analyze data.

The terms "determine", "calculate" and "compute" and variations thereof, are used interchangeably and include any type of methodology, process, mathematical operation or technique.

The term "electronic address" refers to any contactable address, including a telephone number, instant message handle, e-mail address, Universal Resource Locator (URL), Universal Resource Identifier (URI), Address of Record (AOR), electronic alias in a database, like addresses and combinations thereof.

An "enterprise" refers to a business and/or governmental organization, such as a corporation, partnership, joint venture, agency, military branch and the like.

A geographic information system (GIS) is a system to capture, store, manipulate, analyze, manage and present all types of geographical data. A GIS can be thought of as a system—it digitally makes and "manipulates" spatial areas that may be jurisdictional, purpose or application-oriented. In a general sense, GIS describes any information system that integrates, stores, edits, analyzes, shares and displays geographic information for informing decision making.

The terms "instant message" and "instant messaging" refer to a form of real-time text communication between two or more people, typically based on typed text. Instant messaging can be a communication event.

The term "internet search engine" refers to a web search engine designed to search for information on the World Wide Web and File Transfer Protocol (FTP) servers. The search results are generally presented in a list of results often referred to as Search Engine Results Pages (SERPS). The information may consist of web pages, images, information and other types of files. Some search engines also mine data available in databases or open directories. Web search engines work by storing information about many web pages, which they retrieve from the html itself. These pages are retrieved by a Web crawler (sometimes also known as a spider)—an automated Web browser which follows every link on the site. The contents of each page are then analyzed to determine how it should be indexed (for example, words are extracted from the titles, headings, or special fields called meta tags). Data about web pages are stored in an index database for use in later queries. Some search engines, such as Google™, store all or part of the source page (referred to as a cache) as well as information about the web pages, whereas others, such as AltaVista™, store every word of every page they find.

The term "means" as used herein shall be given its broadest possible interpretation in accordance with 35 U.S.C., Section 112, Paragraph 6. Accordingly, a claim incorporating the term "means" shall cover all structures, materials or acts set forth herein, and all of the equivalents thereof. Further, the structures, materials or acts and the equivalents thereof shall include all those described in the summary of the invention, brief description of the drawings, detailed description, abstract and claims themselves.

The term "module" as used herein refers to any known or later developed hardware, software, firmware, artificial intelligence, fuzzy logic or combination of hardware and software that is capable of performing the functionality associated with that element.

A "server" is a computational system (e.g., having both software and suitable computer hardware) to respond to requests across a computer network to provide, or assist in providing, a network service. Servers can be run on a dedicated computer, which is also often referred to as "the server", but many networked computers are capable of hosting servers. In many cases, a computer can provide several services and have several servers running. Servers commonly operate within a client-server architecture, in which servers are computer programs running to serve the requests of other programs, namely the clients. The clients typically connect to the server through the network but may run on the same computer. In the context of IP networking, a server is often a program that operates as a socket listener. An alternative model, the peer-to-peer networking module, enables all computers to act as either a server or client, as needed. Servers often provide essential services across a network, either to private users inside a large organization or to public users via the Internet.

The term "sound" or "sounds" as used herein refers to vibrations (changes in pressure) that travel through a gas, liquid or solid at various frequencies. Sound(s) can be measured as differences in pressure over time and include frequencies that are audible and inaudible to humans and other animals. Sound(s) may also be referred to as frequencies herein.

The terms "audio output level" and "volume" are used interchangeably a refer to the amplitude of sound produced when applied to a sound producing device.

The term "multi-party" as used herein may refer to communications involving at least two parties. Examples of multi-party calls may include, but are in no way limited to, person-to-person calls, telephone calls, conference calls, communications between multiple participants and the like.

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit", "module" or "system". Any combination of one or more computer readable medium(s) may be utilized. The computer readable medium may be a computer readable signal medium or a computer readable storage medium.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core i5-4670K and i7-4770K 22 nm Haswell, Intel® Core® i5-3570K 22 nm Ivy Bridge, the AMD® FX™ family of processors, AMD® FX-4300, FX-6300 and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARIVI926EJ-S™ processors, other industry-equivalent processors, and may perform computational functions using any known or future-developed standard, instruction set, libraries and/or architecture.

The ensuing description provides embodiments only and is not intended to limit the scope, applicability or configuration of the claims. Rather, the ensuing description will provide those skilled in the art with an enabling description for implementing the embodiments. It will be understood that various changes may be made in the function and arrangement of elements without departing from the spirit and scope of the appended claims.

Any reference in the description including an element number, without a sub element identifier when a sub element identifier exists in the figures, when used in the plural, is intended to reference any two or more elements with a like element number. When such a reference is made in the singular form, it is intended to reference one of the elements with the like element number without limitation to a specific one of the elements. Any explicit usage herein to the contrary or providing further qualification or identification shall take precedence.

The exemplary systems and methods of this disclosure will also be described in relation to analysis software, modules and associated analysis hardware. However, to avoid unnecessarily obscuring the present disclosure, the following description omits well-known structures, components, and devices, which may be omitted from or shown in a simplified form in the figures or otherwise summarized.

For purposes of explanation, numerous details are set forth in order to provide a thorough understanding of the present disclosure. It should be appreciated, however, that the present disclosure may be practiced in a variety of ways beyond the specific details set forth herein.

The preceding is a simplified summary of the disclosure to provide an understanding of some aspects of the disclosure. This summary is neither an extensive nor exhaustive overview of the disclosure and its various aspects, embodiments and/or configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments and/or configurations of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

BRIEF DESCRIPTION OF THE DRAWINGS

The present disclosure will be described in conjunction with the appended figures.

DETAILED DESCRIPTION

Figure 1:
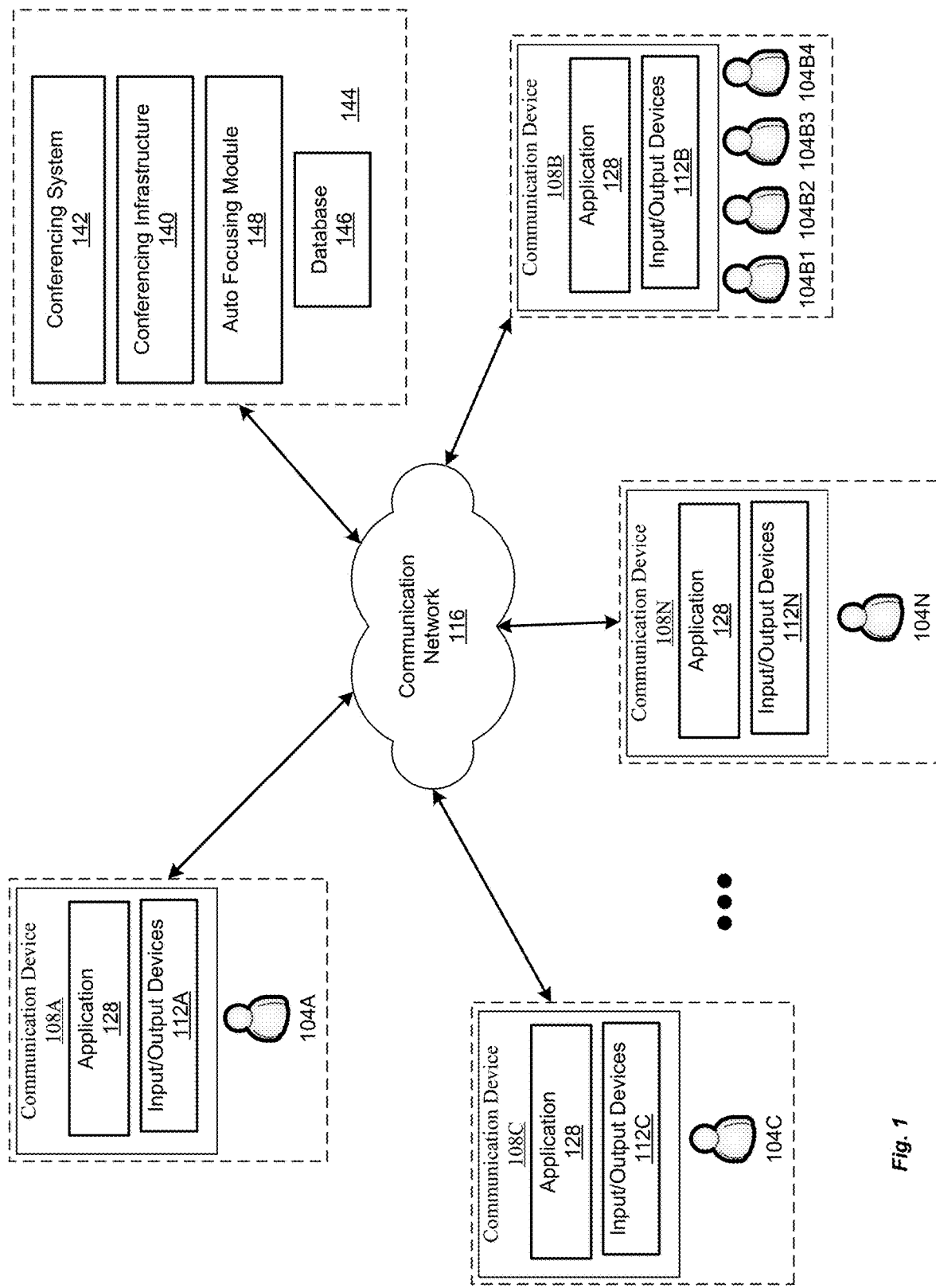
FIG. 1 is a block diagram of an illustrative communication system used for auto focusing on a speaker during a communication session according to embodiments of the present disclosure.

The ensuing description provides embodiments only, and is not intended to limit the scope, applicability, or configuration of the claims. Rather, the ensuing description will provide those skilled in the art with an enabling description for implementing the embodiments. Various changes may be made in the function and arrangement of elements without departing from the spirit and scope of the present disclosure.

According to embodiments of the present disclosure, a speaker's image and voice information are gathered from a communication session in multi-participant communication conferencing. Registered facial and voice prints from each of the participants to the communication session along with Artificial Intelligence (AI) are used to gather the speaker's image and voice information of a speaking participant. As an example embodiment of the present disclosure, a communication session includes multiple individual participants at different locations using different communication endpoints or devices and also includes multiple participants at the same location using the same communication endpoint. Prior to joining the communication session, each of the participants registers a facial print and a corresponding voice print with the server hosting the communication session. The server, using AI capabilities, performs facial recognition to determine the number of the participants at the start of the communication session. After each of the participants has been identified, the server retrieves the corresponding voice print for the identified participants. As the communication session begins, the server using AI capabilities, identifies one of the participants of the multiple participants at the same location using the same communication endpoint, that looks at the camera of the communication endpoint and begins to speak. For example, the server using AI capabilities, can detect the movement of the speaker's mouth as the speaker faces the camera. The server identifies one of the participants to the communication session as the speaker and retrieves the participant's registered voice print for comparison.

The server then compares the speaker's voice information with the speaker's registered voice print. The speaker's voice information may vary in many properties, including but not limited to the volume, the pitch, the pace, the range, the intensity, the tone and the frequency, for example. If the speaker's voice information and the speaker's registered voice print match, the server zooms in on the speaker.

According to an embodiment of the present disclosure, the server detects that only one of the participants is speaking and removes the other participants from the video frame and zooms in on the participant that is speaking. When another one of the participants speaks (i.e., the current speaker) after the previous speaker stops speaking, the server identifies the current speaker from the registered facial print and the corresponding registered voice print and focuses out (zooms out) from the previous speaker and focuses in (zooms in) on the current speaker. According to embodiments of the present disclosure, the AI provided by the server analyzes incoming video frames and splices the incoming video frames based on the registered facial prints to produce an output video with a similar feel to that of videos in motion pictures.

According to an embodiment of the present disclosure, after the server, using AI capabilities, selects one of the participants as the speaker based on a match between the speaker's image and voice information and the speaker's registered facial and voice prints, other background sounds such as the voices of the other participants speaking in the background are filtered out. Since the server has access to the registered voice prints of the other participants, filtering out the voice information from the other participants is performed in a similar manner by comparing the voice information of the other participants with the registered voice prints of the other participants.

FIG. 1 is a block diagram of an illustrative communication system 100 used for auto focusing on a speaker during a communication session according to embodiments of the present disclosure. Referring to FIG. 1, the communication system 100 is illustrated in accordance with at least one embodiment of the present disclosure. The communication system 100 may allow a user 104A to participate in the communication system 100 using a communication device 108A having an input/output device 112A and an application 128. As used herein, the communication devices include user devices. Other users 104B1, 104B2, 104B3, 104B4, 104C to 104N also can participate in the communication system 100 using respective communication devices 108B, 108C through 108N having input/output devices 112B, 112C to 112N and applications 128. In accordance with embodiments of the present disclosure, one or more of the users 104A-104N may access a conferencing system 142 utilizing the communication network 116.

As discussed in greater detail below, the input/output devices 112A to 112N, may include one or more audio input devices, audio output devices, video input devices and/or video output devices. In some embodiments of the present disclosure, the audio input/output devices 112A-112N may be separate from the communication devices 108A-108N. For example, an audio input device may include, but is not limited to, a receiver microphone used by the communication device 108A, as part of the communication device 108A and/or an accessory (e.g., a headset, etc.) to convey audio to one or more of the other communication devices 108B-108N and the conferencing system 142. In some cases, the audio output device may include, but is not limited to speakers, which are part of a headset, standalone speakers or speakers integrated into the communication devices 108A-108N.

Video input devices, such as cameras may correspond to an electronic device capable of capturing and/or processing an image and/or a video content. The cameras may include suitable logic, circuitry, interfaces and/or code that may be operable to capture and/or process an image and/or a video content. In an embodiment of the present disclosure, the cameras may be a Pan-Tilt-Zoom (PTZ) camera. In an embodiment of the present disclosure, the PTZ of the cameras may be controlled mechanically. In another embodiment, the PTZ of the cameras may be electronically controlled using solid state components.

In an embodiment of the present disclosure, the cameras may be high resolution cameras that capture high-resolution wide-angle images and/or videos. In another embodiment of the present disclosure, the cameras may be built from a plurality of smaller-resolution cameras. The plurality of smaller resolution cameras may be built into a single housing. In another embodiment, the plurality of smaller resolution cameras may be separate. In such a case, the output signals of the plurality of smaller resolution cameras may be calibrated. Images and/or videos captured by the plurality of smaller resolution cameras may be combined into a single high-resolution image. In an embodiment of the present disclosure, the plurality of smaller resolution cameras may be set up such that the field of view of the plurality of the smaller resolution cameras may overlap so that their combined output signal results in a high-resolution image.

In an embodiment of the present disclosure, the cameras may be installed at one or more locations in the vicinity of a participant(s) to be tracked. The cameras may be installed at locations such that the cameras may be able to automatically capture images of the tracked participant(s). In an embodiment of the present disclosure, the cameras may be installed in such a way that a position of each of the cameras is fixed. In an alternative embodiment of the present disclosure, one or more of the cameras, may be installed in such a way that one or more of the cameras may be controlled electronically and/or mechanically. The cameras may be operable to adjust the PTZ based on one or more signals received from a control device.

The cameras may be operable to transmit one or more signals to the control device.

The communication network 116 may be packet-switched and/or circuit-switched. An illustrative communication network 116 includes, without limitation, a Wide Area Network (WAN), such as the Internet, a Local Area Network (LAN), a Personal Area Network (PAN), a Public Switched Telephone Network (PSTN), a Plain Old Telephone Service (POTS) network, a cellular communications network, an Internet Protocol Multimedia Subsystem (IMS) network, a Voice over Internet Protocol (VoIP) network, a Session Initiated Protocol (SIP) network or combinations thereof. The Internet is an example of the communication network 116 that constitutes an Internet Protocol (IP) network including many computers, computing networks, and other communication devices located all over the world, which are connected through many telephone systems and other means. In one configuration, the communication network 116 is a public network supporting the Transmission Control Protocol/IP (TCP/IP) suite of protocols. Communications supported by the communication network 116 include real-time, near-real-time, and non-real-time communications. For instance, the communication network 116 may support voice, video, text, web-conferencing, or any combination of media. Moreover, the communication network 116 may include a number of different communication media such as coaxial cable, copper cable/wire, fiber-optic cable, antennas for transmitting/receiving wireless messages and combinations thereof. In addition, it can be appreciated that the communication network 116 need not be limited to any one network type, and instead may include a number of different networks and/or network types. It should be appreciated that the communication network 116 may be distributed. Although embodiments of the present disclosure will refer to one communication network 116, it should be appreciated that the embodiments claimed herein are not so limited. For instance, more than one communication network 116 may be joined by combinations of servers and networks.

The term "communication device" as used herein is not limiting and may be referred to as a user device and mobile device, and variations thereof. A communication device, as used herein, may include any type of device capable of communicating with one or more other device and/or across a communications network, via a communications protocol and the like. A communication device may include any type of known communication equipment or collection of communication equipment. Examples of an illustrative communication device may include, but are not limited to, any device with a sound and/or pressure receiver, a cellular phone, a smart phone, a telephone, handheld computers, laptops, netbooks, notebook computers, subnotebooks, tablet computers, scanners, portable gaming devices, pagers, Global Positioning System (GPS) modules, portable music players and other sound and/or pressure receiving devices. A communication device does not have to be Internet-enabled and/or network-connected. In general, each communication device may provide many capabilities to one or more users who desire to use or interact with the conferencing system 142. For example, a user may access the conferencing system 142 utilizing the communication network 116.

Capabilities enabling the disclosed systems and methods may be provided by one or more communication devices through hardware or software installed on the communication device, such as the application 128. For example, the application 128 may be in the form of a communication application and can be used to identify a speaker during a communication session.

In general, each communication device 108A-108N may provide many capabilities to one or more users 104A-104N who desire to interact with the conferencing system 142. The communication devices 108A, 104C and 108N are depicted as being utilized by one user, 104A, 104C and 104N, respectively. According to embodiments of the present disclosure, the communication device 104B is shared by multiple users 104B1, 104B2, 104B3 and 104B4.

In some embodiments of the present disclosure, the conferencing system 142 may reside within a server 144. The server 144 may be a server that is administered by an enterprise associated with the administration of communication device(s) or owning communication device(s), or the server 144 may be an external server that can be administered by a third-party service, meaning that the entity which administers the external server is not the same entity that either owns or administers a communication device. In some embodiments of the present disclosure, an external server may be administered by the same enterprise that owns or administers a communication device. As one particular example, a communication device may be provided in an enterprise network and an external server may also be provided in the same enterprise network. As a possible implementation of this scenario, the external server may be configured as an adjunct to an enterprise firewall system, which may be contained in a gateway or Session Border Controller (SBC) which connects the enterprise network to a larger unsecured and untrusted communication network. An example of a messaging server is a unified messaging server that consolidates and manages multiple types, forms, or modalities of messages, such as voice mail, e-mail, short-message-service text message, instant message, video call and the like. As another example, a conferencing server is a server that connects multiple participants to a conference call. As illustrated in FIG. 1, the server 144 includes a conferencing system 142, a conferencing infrastructure 140, an auto focusing module 148 and a database 146.

Although various modules and data structures for the disclosed systems and methods are depicted as residing on the server 144, one skilled in the art can appreciate that one, some, or all of the depicted components of the server 144 may be provided by other software or hardware components. For example, one, some, or all of the depicted components of the server 144 may be provided by logic on a communication device (e.g., the communication device may include logic for the systems and methods disclosed herein so that the systems and methods are performed locally at the communication device). Further, the logic of application 128 can be provided on the server 144 (e.g., the server 144 may include logic for the systems and methods disclosed herein so that the systems and methods are performed at the server 144). In embodiments of the present disclosure, the server 144 can perform the methods disclosed herein without use of logic on any of the communication devices 108A-108N.

The conferencing system 142 implements functionality for the systems and methods described herein by interacting with two or more of the communication devices 108A-108N, the application 128, the conferencing infrastructure 140, the auto focusing module 148 and the database 146 and/or other sources of information as discussed in greater detail below that can allow two or more communication devices 108 to participate in a multi-party call. In some embodiments of the present disclosure the auto focusing module 148 can also be part of the conferencing system application executing on the user's device. One example of a multi-party call includes, but is not limited to, a person-to-person call, a conference call between two or more users/parties and the like. Although some embodiments of the present disclosure are discussed in connection with multi-party calls, embodiments of the present disclosure are not so limited. Specifically, the embodiments disclosed herein may be applied to one or more of audio, video, multimedia, conference calls, web conferences and the like.

In some embodiments of the present disclosure, the conferencing system 142 can include one or more resources such as the conferencing infrastructure 140 as discussed in greater detail below. As can be appreciated, the resources of the conferencing system 142 may depend on the type of multi-party call provided by the conferencing system 142.

Among other things, the conferencing system 142 may be configured to provide conferencing of at least one media type between any number of the participants. The conferencing infrastructure 140 can include hardware and/or software resources of the conferencing system 142 that provide the ability to hold multi-party calls, conference calls and/or other collaborative communications.

In some embodiments of the present disclosure, the auto focusing module 148 may be used to focus in on a speaker when multiple participants share a single communication device. This is accomplished by comparing a speaker's image and voice information with the speaker's registered facial and voice prints using AI capabilities. Image and voice information from the other participants to the communication session are filtered out. As discussed in greater detail below, the auto focusing module 148 includes several components, including an audio analyzer, a video analyzer, a filtering module and an artificial intelligence module as discussed in greater detail below.

The database 146 may include information pertaining to one or more of the users 104A-104N, communication devices 108A-108N, and conferencing system 142, among other information. For example, the database 146 includes registered facial prints and corresponding voice prints for each of the participants of a communication session.

The conferencing infrastructure 140 and the auto focusing module 148 may allow access to information in the database 146 and may collect information from other sources for use by the conferencing system 142. In some instances, data in the database 146 may be accessed utilizing the conferencing infrastructure 140, the auto focusing module 148 and the application 128 running on one or more of the communication devices, such as the communication devices 108A-108N.

The application 128 may be executed by one or more of the communication devices (e.g., the communication devices 108A-108N) and may execute all or part of the conferencing system 142 at one or more of the communication devices 108A-108N by accessing data in the database 146 using the conferencing infrastructure 140 and the auto focusing module 148. Accordingly, a user may utilize the application 128 to access and/or provide data to the database 146. For example, a user 104B2 may utilize the application 128 executing on the communication device 108B to register his/her facial print and voice print prior to engaging in a communication session with joint participants 104B1, 104B3 and 104B4 as well as individual participants 104A and 104C-104N. Such data may be received at the conferencing system 142 and associated with one or more profiles associated with the user 104B2 and the other participants to the conference call 104A, 104B1, 104B3, 104B4 and 104C-104N and stored in the database 146.

Figure 2:
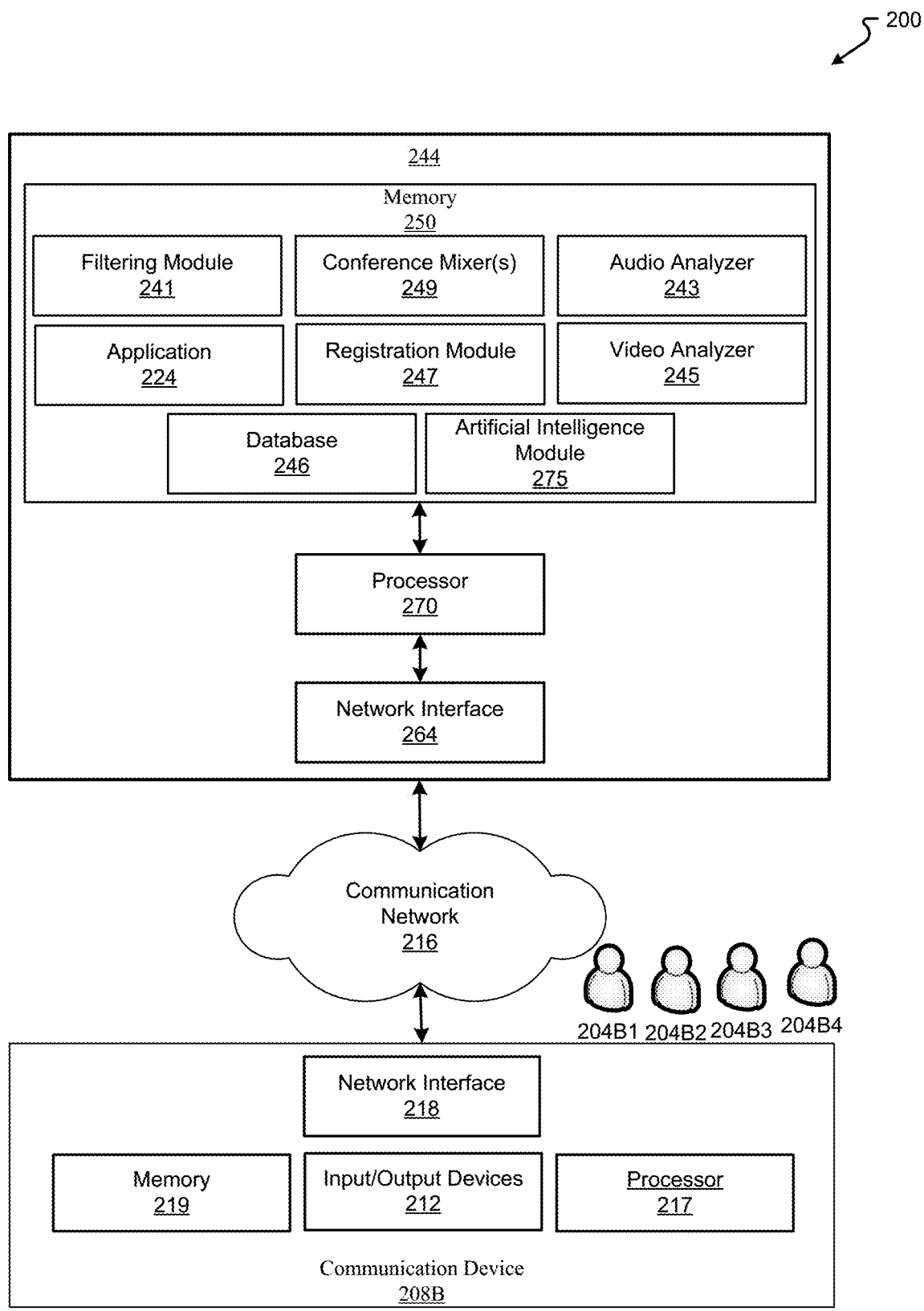
FIG. 2 is a block diagram of an illustrative conferencing server provided in a communication system used for auto focusing on a speaker during a communication session according to embodiments of the present disclosure.

FIG. 2 is a block diagram of an illustrative conferencing server 244 provided in a communication system 200 used for auto focusing on a speaker during a communication session according to embodiments of the present disclosure. Referring to FIG. 2, the communication system 200 is illustrated in accordance with at least one embodiment of the present disclosure. The communication system 200 may allow users to participate in a conference call with other users. According to an embodiment of the present disclosure, multiple users (e.g., the joint participants 204B1-204B4) can participate in the communication session using the same communication device 208B. The conferencing server 244 implements functionality establishing the communication session for the systems and methods described herein by interacting with the communication devices (including its hardware and software components) and the various components of the conferencing server 244. For example, the conferencing server 244 includes a memory 250 and a processor 270. Furthermore, the conferencing server 244 includes a network interface 264. The memory 250 includes a database 246, an application 224 (used in conjunction with the application 128 of the communication devices 108A-108N), conference mixer(s) 249 (part of the conferencing infrastructure 140 illustrated in FIG. 1), an audio analyzer 243, a video analyzer 245, a registration module 247, a filtering module 241 and an artificial intelligence module 275.

The processor 270 may include a microprocessor, a Central Processing Unit (CPU), a collection of processing units capable of performing serial or parallel data processing functions and the like. The memory 250 may include a number of applications or executable instructions that are readable and executable by the processor 270. For example, the memory 250 may include instructions in the form of one or more modules and/or applications. The memory 250 may also include data and rules in the form of setting that can be used by one or more of the modules and/or applications described herein. The memory 250 may also include one or more communication applications and/or modules, which provide communication functionality of the conferencing sever 244. In particular, the communication application(s) and/or module(s) may contain the functionality necessary to enable the conferencing server 244 to communicate with communication device 208B as well as other communication devices (not shown) across the communication network 216. As such, the communication application(s) and/or module(s) may have the ability to access communication preferences and other settings, maintained within the database 246, the registration module 247 and/or the memory 250), format communication packets for transmission via the network interface 264, as well as condition communication packets received at the network interface 264 for further processing by the processor 270.

Among other things, the memory 250 may be used to store instructions, that when executed by the processor 270 of the communication system 200, perform the methods as provided herein. In some embodiments of the present disclosure, one or more of the components of the communication system 200 may include a memory. In one example, each component in the communication system 200 may have its own memory. Continuing this example, the memory 250 may be a part of each component in the communication system 200. In some embodiments of the present disclosure, the memory 250 may be located across the communication network 216 for access by one or more components in the communication system 200. In any event, the memory 250 may be used in connection with the execution of application programming or instructions by the processor 270, and for the temporary or long-term storage of program instructions and/or data. As examples, the memory 250 may include Random-Access Memory (RAM), Dynamic RAM (DRAM), Static RAM (SDRAM) or other solid-state memory. Alternatively, or in addition, the memory 250 may be used as data storage and can include a solid-state memory device or devices. Additionally, or alternatively, the memory 250 used for data storage may include a hard disk drive or other random-access memory. In some embodiments of the present disclosure, the memory 250 may store information associated with a user, a timer, rules, recorded audio information, recorded video information and the like. For instance, the memory 250 may be used to store predetermined speech characteristics, private conversation characteristics, video characteristics, information related to mute activation/deactivation, times associated therewith, combinations thereof and the like.

The network interface 264 includes components for connecting the conferencing server 244 to the communication network 216. In some embodiments of the present disclosure, a single network interface 264 connects the conferencing server 244 to multiple networks. In some embodiments of the present disclosure, a single network interface 264 connects the conferencing server 244 to one network and an alternative network interface is provided to connect the conferencing server 244 to another network. The network interface 264 may include a communication modem, a communication port or any other type of device adapted to condition packets for transmission across a communication network 216 to one or more destination communication devices (not shown), as well as condition received packets for processing by the processor 270. Examples of network interfaces include, without limitation, a network interface card, a wireless transceiver, a modem, a wired telephony port, a serial or parallel data port, a radio frequency broadcast transceiver, a Universal Serial Bus (USB) port or other wired or wireless communication network interfaces.

The type of network interface 264 utilized may vary according to the type of network which the conferencing server 244 is connected, if at all. Exemplary communication networks 216 to which the conferencing server 244 may connect via the network interface 264 include any type and any number of communication mediums and devices which are capable of supporting communication events (also referred to as "phone calls", "messages", "communications" and "communication sessions" herein), such as voice calls, video calls, chats, e-mails, Teletype (TTY) calls, multimedia sessions or the like. In situations where the communication network 216 is composed of multiple networks, each of the multiple networks may be provided and maintained by different network service providers. Alternatively, two or more of the multiple networks in the communication network 216 may be provided and maintained by a common network service provider or a common enterprise in the case of a distributed enterprise network.

The conference mixer(s) 249 as well as other conferencing infrastructure can include hardware and/or software resources of the conferencing system 142 that provide the ability to hold multi-party calls, conference calls and/or other collaborative communications. As can be appreciated, the resources of the conferencing system 142 may depend on the type of multi-party call provided by the conferencing system 142. Among other things, the conferencing system 142 may be configured to provide conferencing of at least one media type between any number of the participants. The conference mixer(s) 249 may be assigned to a particular multi-party call for a predetermined amount of time. In one embodiment of the present disclosure, the conference mixer(s) 249 may be configured to negotiate codecs with each of the communication devices 108A-108N participating in a multi-party call. Additionally, or alternatively, the conference mixer(s) 249 may be configured to receive inputs (at least including audio inputs) from each participating communication device 108A-108N and mix the received inputs into a combined signal which can be provided to each of the communication devices 108A-108N in the multi-party call.

The audio analyzer 243 is used first to register voice prints. These voice prints are stored in the registration module 247. The audio analyzer 243 is also used to identify voice information of a participant to a communication session (e.g., the speech of the participant to the communication session). The voice information of the participant to a communication session is identified by comparing the voice information of the participant to the communication session with the registered voice print of the participant using the artificial intelligence module 275. The audio analyzer 243 not only identifies the voice information from the individual participants to the communication session, but also identifies the voice information for the joint participants to the communication session. According to embodiments of the present disclosure, the speech of each of the participants is represented as a waveform. This waveform is captured in a sound format, such as, but not limited to Audio Video Interleaved (AVI), Motion Picture Experts Group-1 Audio Layer-3 (MP3), etc. by the audio analyzer 243 using the artificial intelligence module 275. Thus, the voice print is a waveform representation of sound of the participant's speech.

The video analyzer 245 is used first to register facial prints. These facial prints are stored in the registration module 247. The video analyzer 245 is also used to determine the location of the participants to the communication session by capturing an image of the participants to the communication session prior to the start of the communication session. Using the artificial intelligence module 275 for example, the location (e.g., the seating arrangement) of the participants can be established. The video analyzer 245 is further used to confirm the identity of the participants to the communication session. The identity of a participant of the communication session is confirmed by comparing the image information of the participant to the communication session with the registered facial print of the participant using the artificial intelligence module 275. According to embodiments of the present disclosure, the facial print can be an image (e.g., a picture) or video data.

The video analyzer 245 uses the images provided in the video signal to determine a match between the speaker's image information and one of the registered facial prints to determine or confirm the speaker. The speaker's image information is obtained when a participant looks at the camera of the communication endpoint and begins to speak. The artificial intelligence module 275 incorporating facial recognition technology is used to distinguish the participants to the communication session from background objects as well as distinguish the participants to the communication session from each other. Once a participant that is looking at the camera and begins to speak has been located, the audio analyzer 243 receives the voice information from the located participant. The voice information from the located participant is compared with registered voice prints to confirm the speaker. A match between the speaker's voice information and one of the registered voice prints determines the speaker.

According to an alternative embodiment of the present disclosure, the audio analyzer 243 first receives voice information from one of the participants that begins to speak and compares the speaker's voice information with the registered voice prints stored by the registration module 247. A match between the speaker's voice information and one of the registered voice prints determines the speaker. After determining the speaker's voice information, the video analyzer 245 is used to confirm the speaker's identity. According to further embodiments of the present disclosure, after either the speaker's image information or the speaker's voice information has been identified, the artificial intelligence module 275 is used to automatically confirm the speaker. For example, after the speaker's voice has been identified, the artificial intelligence module 275 using the registration module 247, retrieves the location of the speaker using the captured image of the participants prior to the start of the communication session. This way the speaker can be automatically identified without use of or with limited use of the video analyzer 245. Likewise, after the speaker's image has been identified, the artificial intelligence module 275 using the registration module 247 retrieves the location of the speaker using the captured image of the participants prior to the start of the communication session. This way the speaker can be automatically identified without use of or with limited use of the audio analyzer 243.

Once the speaker has been identified, the filtering module 241 is used to filter out the remaining image information and voice information from the other participants of the joint participants to the communication session. According to embodiments of the present disclosure, the artificial intelligence module 275 is provided for assisting in the audio and video filtering analysis. After or at the same time as the remaining image information and voice information have been filtered out, the image of the identified speaker is zoomed in. According to some implementations of the present disclosure, digital zooming is used in which images from the camera are cropped and enlarged to achieve a zoom effect. When there is a single speaker, the cropped image has the speaker at the center of the image. The size of the cropped image frame is adjusted (e.g., enlarged) to fit the correct zoom factor. For example, if the zoom factor is 2×, the cropped image frame has a width and length that is one-half of the original image, so that when the cropped image is enlarged by 2×, the enlarged image has the same size as the original image, thereby achieving digital zooming. The position of the cropped image is selected to accurately display the chosen participant, e.g., so that the speaker is at the middle of the cropped image.

Figure 4:
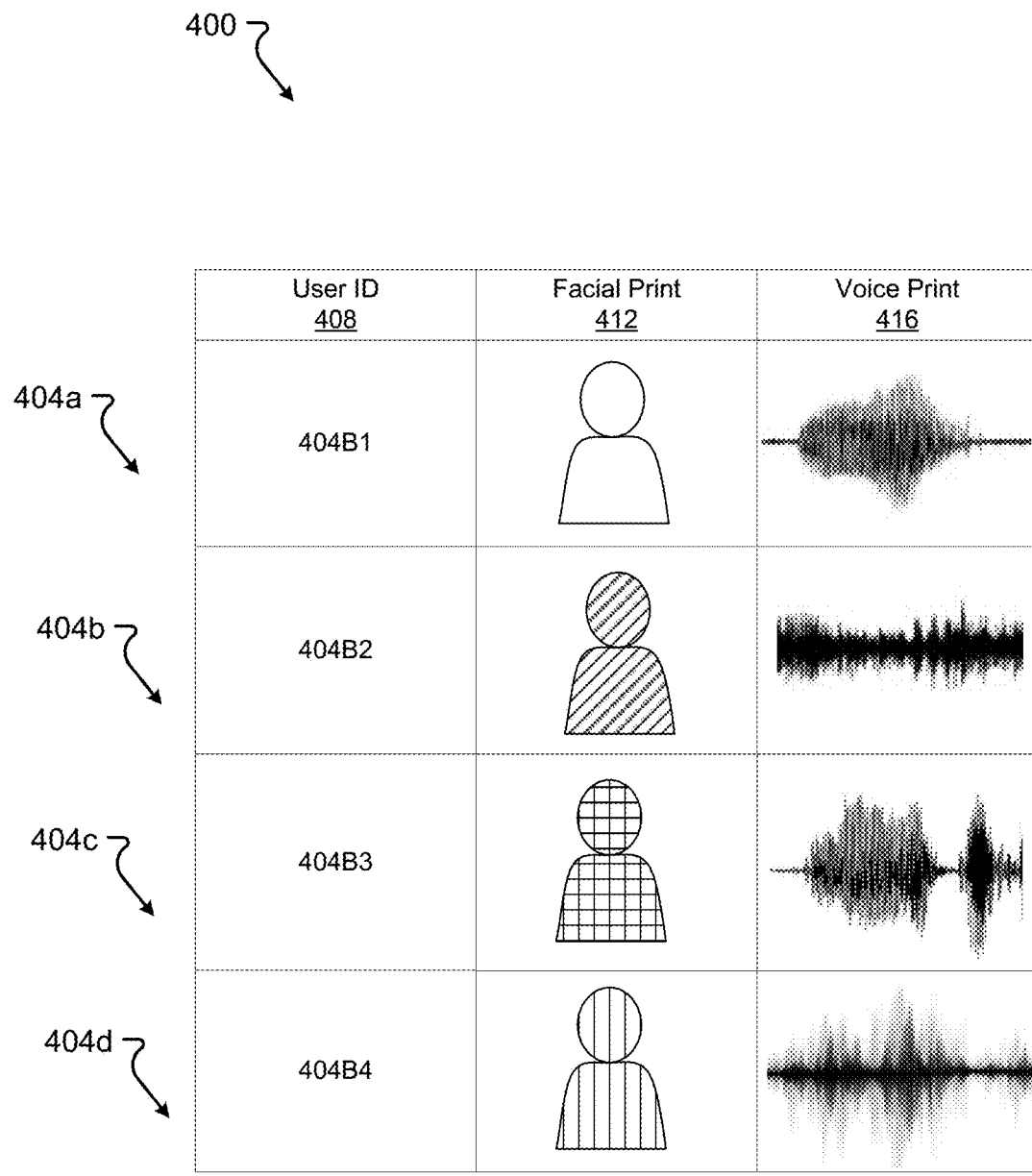
FIG. 4 is a tabular representation of database entries provided by participants or retrieved automatically from one or more data sources and used for auto focusing on a speaker during a communication session according to embodiments of the present disclosure.

FIG. 4 is a tabular representation 400 of database entries provided by the participants or retrieved automatically from one or more data sources and used for auto focusing on a speaker during a communication session according to embodiments of the present disclosure. As illustrated in FIG. 4, the tabular representation 400 includes database entries 404a-404d each including registered information, such as but not limited to a user ID 408, a facial print 412 and a voice print 416. More information may be stored in each of the database entries 404 without departing from the spirit and scope of the present disclosure. The registered facial prints 412 and the voice prints 416 are used to distinguish the users 404B1-404B4 from each other using AI technology. AI technology is used to distinguish the volume, the pitch, the pace, the range, the intensity, the tone and the frequency for each of the registered voice prints 416.

Referring back to FIG. 2, the communication system 200 further includes the communication device 208B which includes the network interface 218, the processor 217, the memory 219 including at least the application 128 and the input/output device 212. A detailed description of the communication device 208B is provided in FIG. 3.

Figure 3:
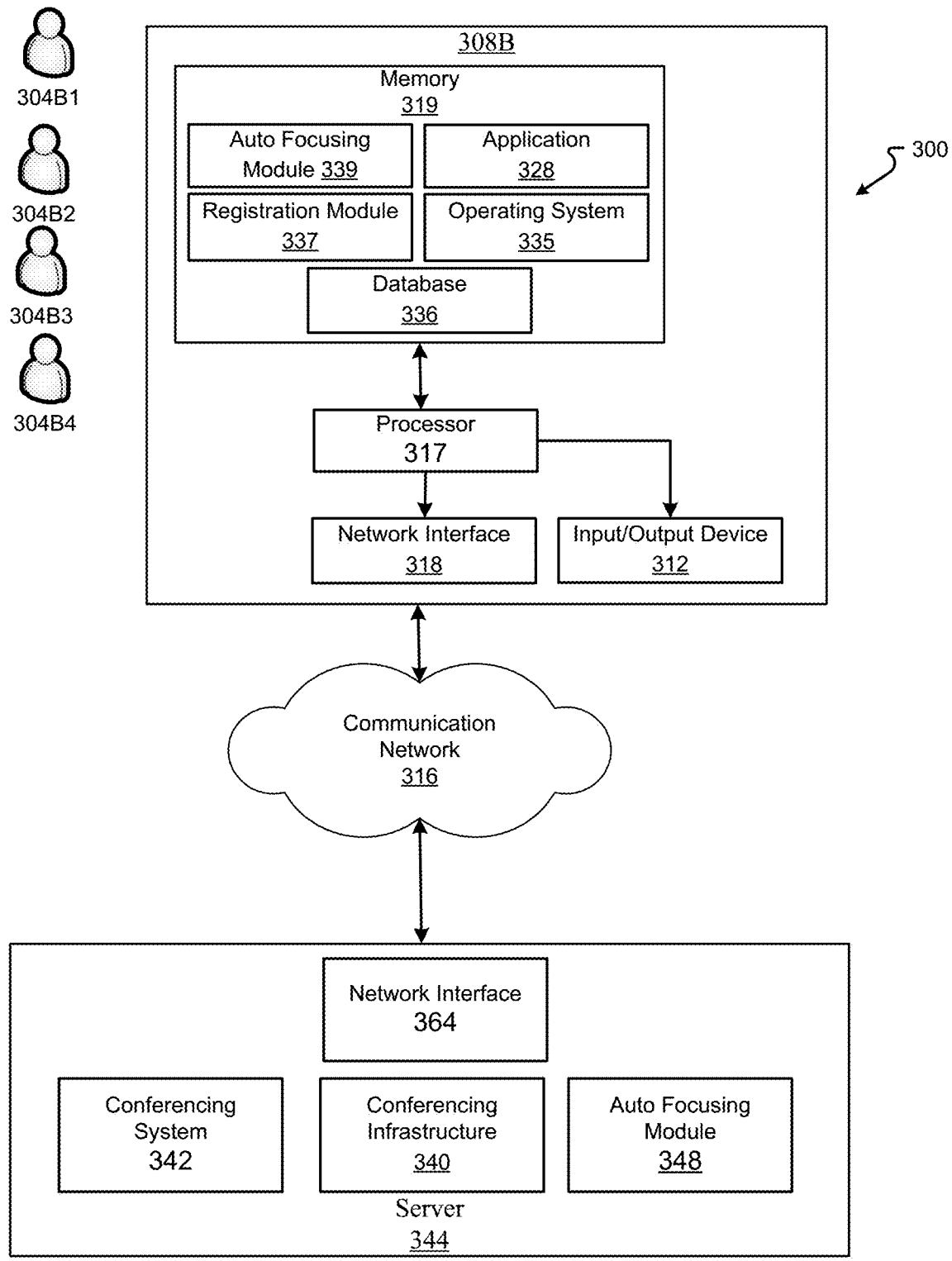
FIG. 3 is a block diagram of an illustrative communication device provided in a communication system used for auto focusing on a speaker during a communication session according to embodiments of the present disclosure.

FIG. 3 is a block diagram of an illustrative communication device 308B provided in a communication system 300 used for auto focusing on a speaker during a communication session according to embodiments of the present disclosure. The communication system 300 includes the communication device 308B capable of allowing users (e.g., the joint participants 304B1-304B4) to interact with the conferencing server 344 is shown in FIG. 3. The depicted communication device 308B includes a processor 317, a memory 319, an input/output device 312, a network interface 318, a database 336, an operating system 335, an application 328, an auto focusing module 339 and a registration module 337. Although the details of only one communication device 308B are depicted in FIG. 3, one skilled in the art will appreciate that one or more other communication devices may be equipped with similar or identical components as the communication device 308 depicted in detail. Components shown in FIG. 3 may correspond to those shown and described in FIGS. 1 and 2.

The input/output device 312 can enable users 304B1-304B4 to interact with the communication device 308B. Exemplary user input devices which may be included in the input/output device 312 include, without limitation, a button, a mouse, a trackball, a rollerball, an image capturing device or any other known type of user input device. Exemplary user output devices which may be included in the input/output device 312 include without limitation, a speaker, a light, a Light Emitting Diode (LED), a display screen, a buzzer or any other known type of user output device. In some embodiments of the present disclosure, the input/output device 312 includes a combined user input and user output device, such as a touch-screen. Using the input/output device 312, user 304B1-304B4 may configure settings via the application 328 for entering facial prints and voice prints, for example.

The processor 317 may include a microprocessor, a CPU, a collection of processing units capable of performing serial or parallel data processing functions, and the like. The processor 317 interacts with the memory 319, the input/output device 312 and the network interface 318 and may perform various functions of the application 328, the operating system 335, the auto focusing module 339 and the registering module 337.

The memory 319 may include a number of applications such as the application 328 or executable instructions such as the operating system 335 that are readable and executable by the processor 317. For example, the memory 319 may include instructions in the form of one or more modules and/or applications. The memory 319 may also include data and rules in the form of one or more settings for thresholds that can be used by the application 328, the operating system 335, the auto focusing module 339, the registering module 337 and the processor 317.

The operating system 335 is a high-level application which enables the various other applications and modules to interface with the hardware components (e.g., the processor 317, the network interface 318 and the input/output device 312 of the communication device 308B). The operating system 335 also enables the users 304B1-304B4 of the communication device 308B to view and access applications and modules in the memory 319 as well as any data, including settings, facial prints, voice prints, etc. In addition, the application 328 may enable other applications and modules to interface with hardware components of the communication device 308B.

The auto focusing module 339 includes several components, including an audio analyzer, a video analyzer, a filtering module and an artificial intelligence module. The audio analyzer is used to identify incoming audio signals from the participant voice information. According to embodiments of the present disclosure, the audio analyzer may be part of the application 328 (e.g., a conferencing application). The audio analyzer may also interface with audio/sound drivers of the operating system 335 through appropriate Application Programming Interface (API)s in order to identify the incoming audio signals. According to an alternative embodiment of the present disclosure, the audio analyzer may also interface with some other component(s) deployed remotely, e.g., in a cloud environment in order to identify the incoming audio signals. When an audio signal is transmitted from the input/output device 312 such as the microphones and received in digital format by the communication device 308B, the audio signal is converted from digital to analog sound waves by a digital to analog converter (not shown) of the audio analyzer. The converted audio signal is then compared with registered voice prints to identity the voice of a participant to the communication session. According to an alternative embodiment of the present disclosure, comparison with registered voice prints to identify the voice of a participant to the communication session may be performed at a service hosted in a cloud environment that the conferencing server 344 would invoke.

The video analyzer is used to identify incoming video signals from the participant image information. According to embodiments of the present disclosure, the video analyzer may be part of the application 328 (e.g., a conferencing application). The video analyzer may also interface with video drivers of the operating system 335 through appropriate APIs in order to identify the incoming video signals. According to an alternative embodiment of the present disclosure, the video analyzer may also interface with some other component(s) deployed remotely, e.g., in a cloud environment in order to identify the incoming video signals.

The registration module 337 is provided for storing the participant's facial and voice prints as well as other identifying information for the participants to the communication session as discussed in greater detail above. The communication system 300 further includes the conferencing server 344 including at least a network interface 364, a conferencing system 342, a conferencing infrastructure 340 and an auto focusing module 348. A detailed description of conferencing server 344 is provided in FIG. 2 discussing above.

Although some applications and modules may be depicted as software instructions residing in the memory 319 and those instructions are executable by the processor 317, one skilled in the art will appreciate that the applications and modules may be implemented partially or totally as hardware or firmware. For example, an Application Specific Integrated Circuit (ASIC) may be utilized to implement some, or all of the functionality discussed herein.

Although various modules and data structures for the disclosed systems and methods are depicted as residing on the communication device 308B, one skilled in the art can appreciate that one, some, or all of the depicted components of the communication device 308B may be provided by other software or hardware components. For example, one, some or all of the depicted components of the communication device 308B may be provided by systems operating on the conferencing server 344. In the illustrative embodiments shown in FIG. 3, the communication device 308B includes all the necessary logic for the systems and methods disclosed herein so that the systems and methods are performed at the communication device 308B. Thus, the communication device 308B can perform the methods disclosed herein without use of logic on the conferencing server 344.

Figure 5:
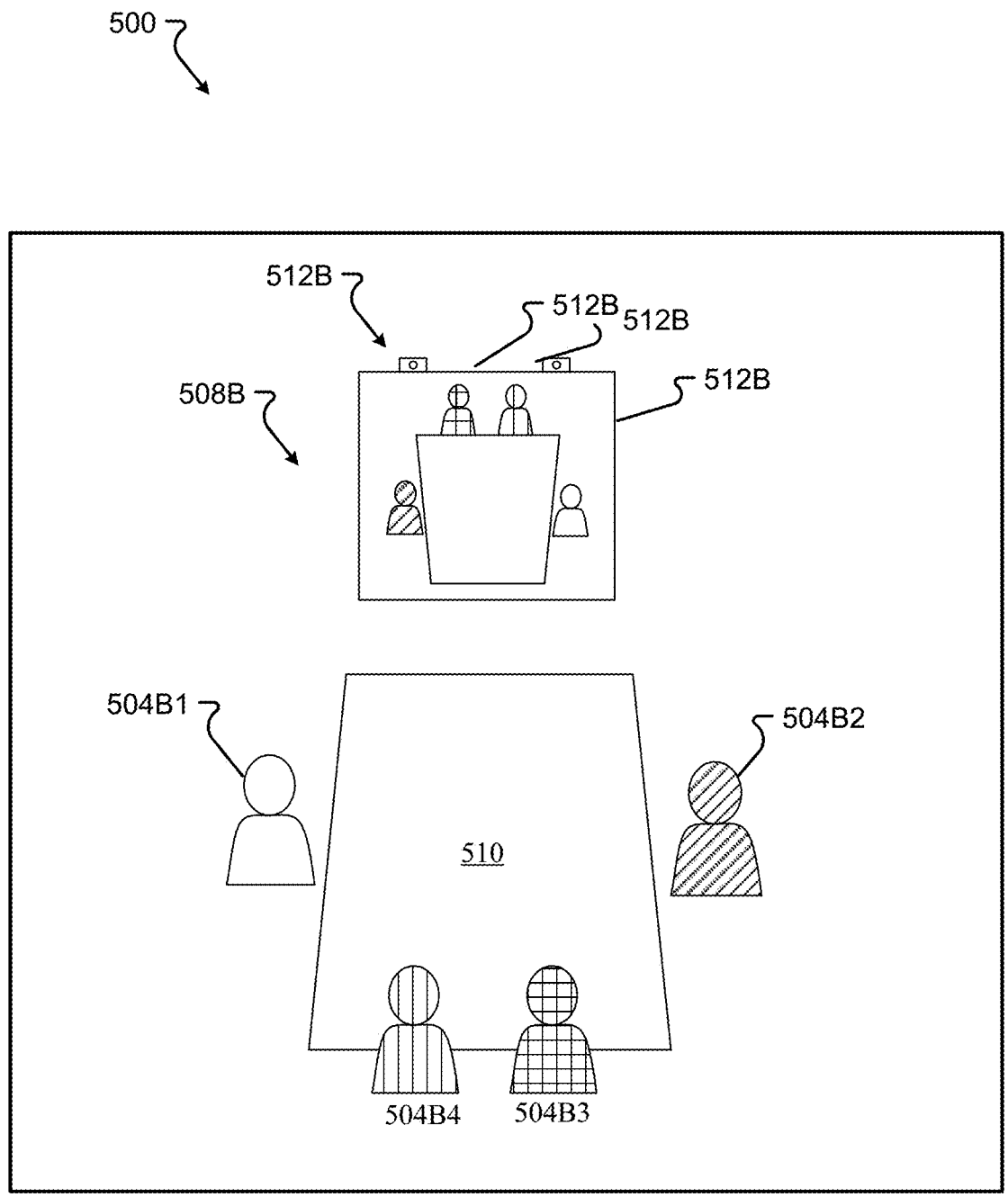
FIG. 5 is a block diagram that illustrates a view of a communication endpoint deployed in a conference area in which there are multiple participants sitting around a table at the start or the end of a communication session according to embodiments of the present disclosure.

FIG. 5 is a block diagram that illustrates a view of a communication endpoint 504B deployed in a conference area 500 in which there are multiple participants 504B1-504B4 sitting around a conference table 510 at the start or the end of a communication session according to embodiments of the present disclosure. The communication endpoint 508B includes the input/output devices 512B in the form of, main or center cameras, one or more speakers and a display. The main or center cameras are positioned proximate and centered on the display. Each of the cameras typically includes PTZ features that may be implemented mechanically and/or digitally. The communication endpoint 504B controls the PTZ features of each of the cameras and captures video of different views/scenes of the participants 504B1-504B4 seated around the conference table 510 opposite from or facing (i.e., in front of) the input/output devices 512B (e.g., the cameras, the speakers and the display). The combination of two cameras depicted in FIG. 5 is only one example of many possible camera combinations that may be used, as would be appreciated by one of ordinary skill in the relevant arts having read the present description. As depicted in the example of FIG. 5, a further input/output device 512B (e.g., a microphone) is positioned above the display so as to receive audio from the participants 504B1-504B4 in the conference area 500.

The input/output devices 512B (e.g., the cameras and the microphone) along with the auto focusing module 148 including the filtering module 241, the registration module 247, the audio analyzer 243, the video analyzer 245 and the artificial intelligence module 275 are configured to automatically locate and zoom in on an active speaker using the communication endpoint 508B and filter out the images and the audio of each of the other non-speaking participants of the communication session. In accordance with embodiments of the present disclosure, the communication endpoint 508B and/or the conferencing server 244 identifies the participant's image (e.g., the participant's face and face position) based on video captured using the input/output devices 512B (e.g., the cameras), the video analyzed by the video analyzer 245 and the technologies applied using the artificial intelligence module 275 to compare the participant's face and face position in the captured video with the registered facial print for each of the participants stored in the registration module 247. With reference to FIG. 4 and continued reference to FIG. 5, the participant 504B1's image is identified as being positioned on the left-hand side of the table 510, the participant 504B2's image is identified as being positioned on the right-hand side of the table 510 across from the participant 504B2's image, the participant 504B4's image is identified as being positioned on the left-hand side of the participant 504B1's image at one end of the table 510 across from the communication endpoint 508B and the participant 504B4's image is identified as being positioned between the participant 504B4's image and the participant 504B2's image at the same end of the table 510 as the participant 504B4's image. As indicated in FIG. 4, a corresponding voice print 416 is associated with each of the participants and used to determine which of the participants is speaking.

Referring back to FIG. 5, the communication endpoint 508B and/or the conferencing server 244 detects positions of talking participants (i.e., "talkers", "active speakers", etc.) based on audio detected by the input/output device 512B (e.g., a microphone), the audio analyzed by the audio analyzer 243 and the technologies applied with the artificial intelligence module 275 to compare the participant's voice information (e.g., the captured audio) with the registered voice prints for each of the participants stored in the registration module 247. After the identity of the speaker has been confirmed, the communication endpoint 508B and/or the conferencing server 244, automatically zooms in on the active speaker and filters out the images and audio of the other non-speaking participants to the communication session.

Figure 6:
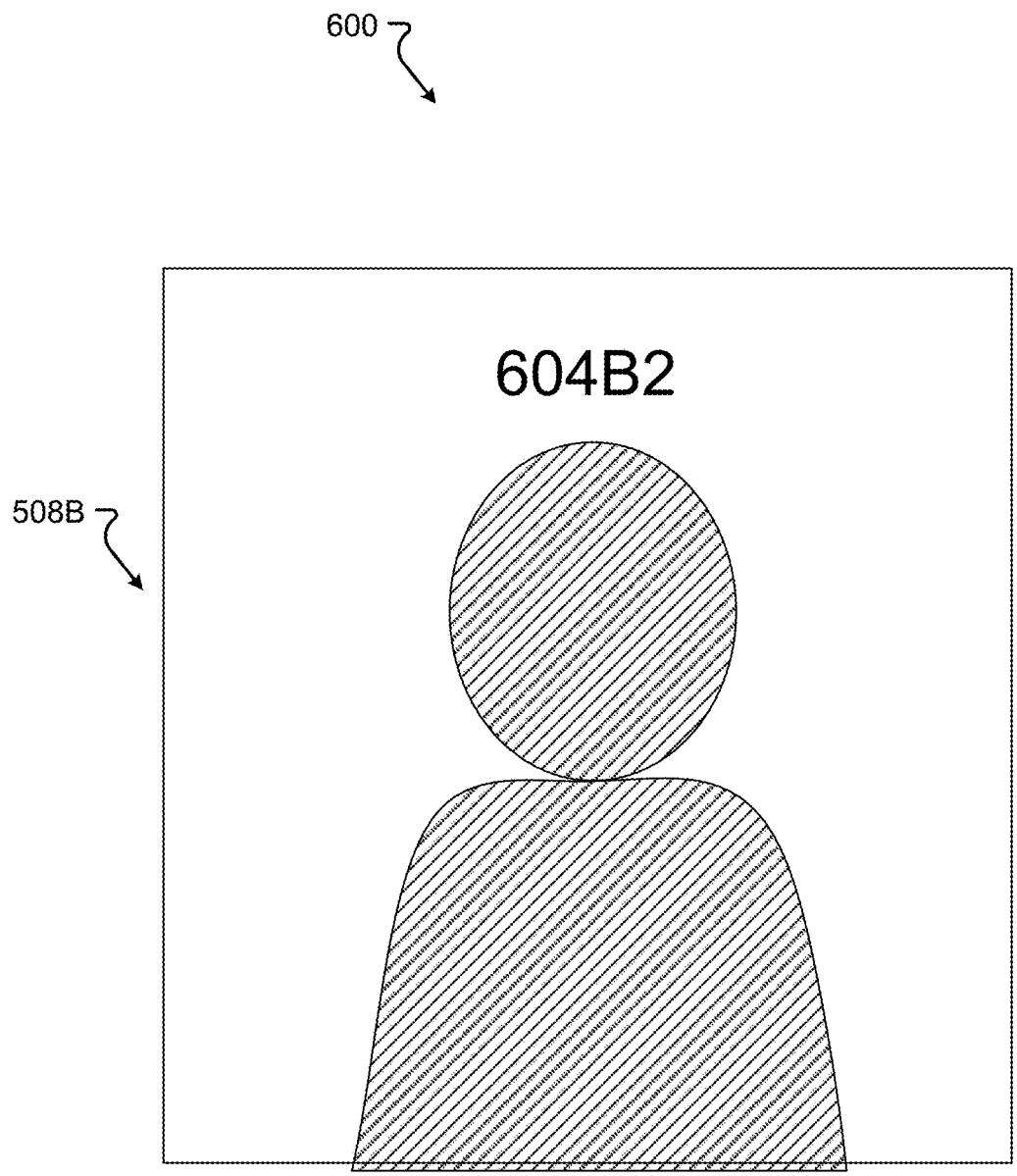
FIG. 6 is a block diagram that illustrates a view of an active speaker at a communication endpoint during a communication session according to embodiments of the present disclosure.

FIG. 6 is a block diagram that illustrates a view 600 of an active speaker 604B2 at a communication endpoint 608B during a communication session according to embodiments of the present disclosure. As illustrated in FIG. 6, the participant 604B2 is identified as the active speaker at the communication endpoint 608B, when the auto focusing module 148 of FIG. 1 determines the captured video and audio of the participant 604B2 matches the registered facial print and voice print of the participant 604B2 when the participant 604B2 starts and continues to speak. According to embodiments of the present disclosure, the video provided to the communication endpoints that is part of the communication session, may be edited to zoom in on the active speaker (e.g., the video stream may be cropped to only show the participant 604B2) with the remainder of the participants being filtered out of the video stream. According to a further embodiment of the present disclosure, background voices from the other participants are also filtered out such that only the active speaker, the participant 604B2, is heard during this point in the communication session.

Figure 7:
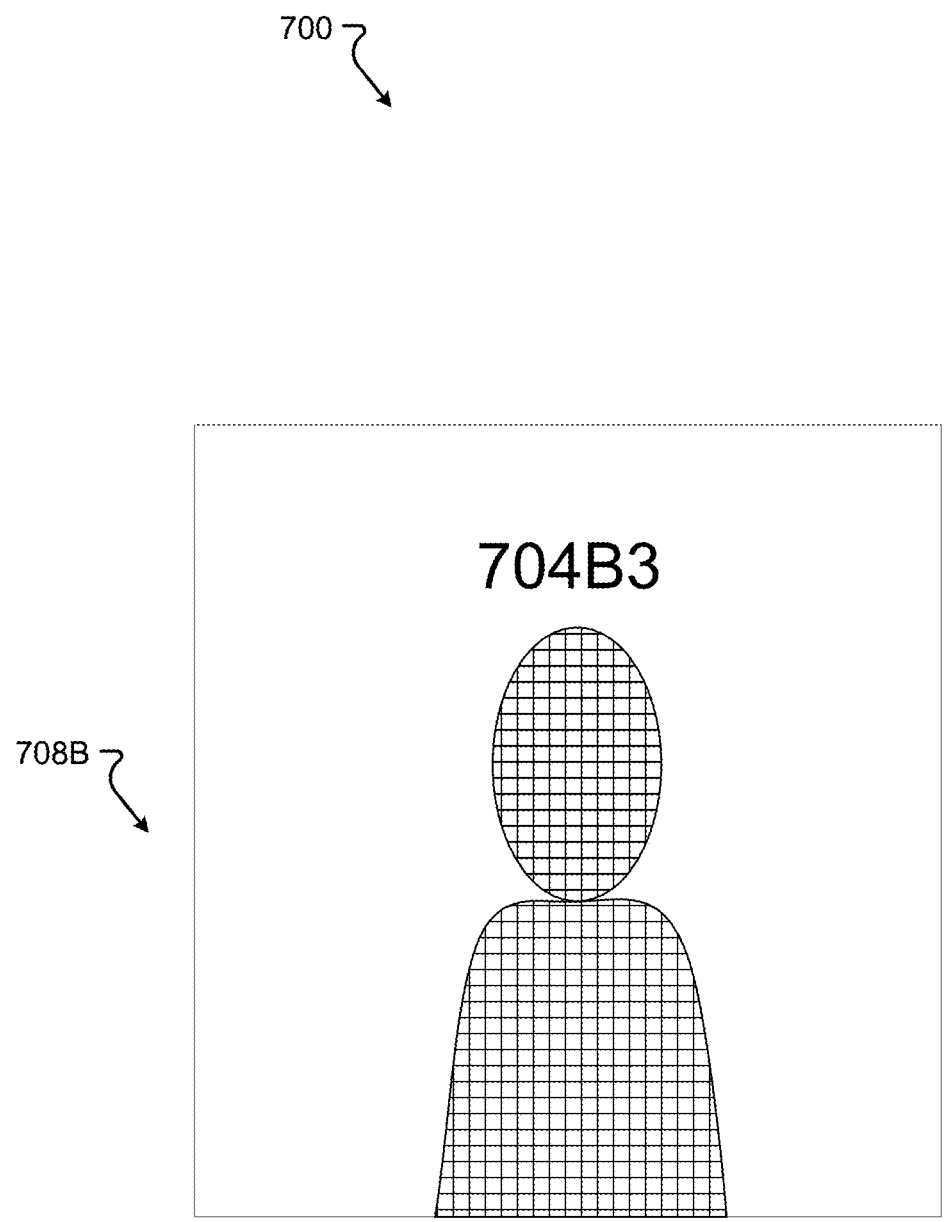
FIG. 7 is a block diagram that illustrates a view of an active speaker at a communication endpoint during a communication session according to embodiments of the present disclosure.

FIG. 7 is a block diagram that illustrates a view 700 of an active speaker 704B3 at a communication endpoint 708B during a communication session according to embodiments of the present disclosure. As illustrated in FIG. 7, the participant 704B3 is identified as the active speaker at the communication endpoint 708B, when the auto focusing module 148 of FIG. 1 determines the captured video and audio of the participant 704B3 matches the registered facial print and voice print of the participant 704B3 when the participant 704B3 starts and continues to speak. According to embodiments of the present disclosure, the video provided to the communication endpoints that is part of the communication session, may be edited to zoom in on the active speaker (e.g., the video stream may be cropped to only show the participant 704B3) with the remainder of the participants being filtered out of the video stream. According to a further embodiment of the present disclosure, the background voices from the other participants are also filtered out such that only the active speaker, the participant 704B3, is heard during this point in the communication session.

According to a further embodiment of the present disclosure, after an active speaker finishes speaking and before another speaker begins to speak, the image of the active speaker that has finished speaking is zoomed out such that an image of all of the participants to the communication session is shown, before a zoomed in image of the next active speaker is shown.

Figure 8:
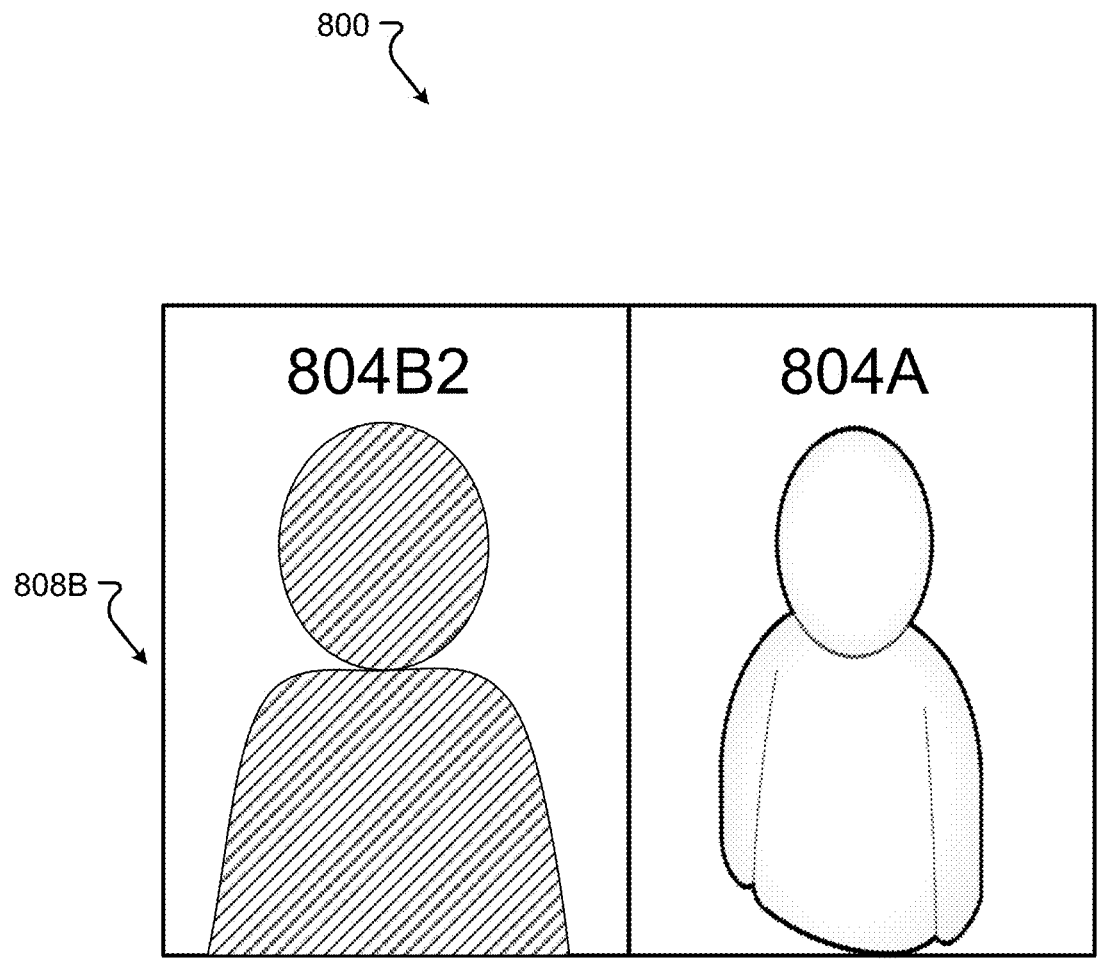
FIG. 8 is a block diagram that illustrates a view of two active speakers at different communication endpoints during a communication session according to embodiments of the present disclosure.

FIG. 8 is a block diagram that illustrates a view 800 of two active speakers 804B2 and 804A at different communication endpoints 808B and 808A during a communication session according to embodiments of the present disclosure. According to one embodiment of the present disclosure, if there are more than one active speaker (e.g., a discussion with rapid changes in speakers), two or more active speakers may be shown at one time, as shown in FIG. 8, to avoid displaying rapid switching back and forth between active speakers. As illustrated in FIG. 8, two active speakers (e.g, 804B2 and 804A) from communication endpoints 808B and 808A, respectively, engage in a conversation. Providing more than one active speaker is used when the participants take turns speaking, but speak in rapid succession, to avoid changing images too rapidly. For example, if more than one change in active speaker occurs in less than a predetermined time period (e.g., ten seconds), multiple images may be displayed since changing the image too often could be disruptive to viewers.

Figure 9:
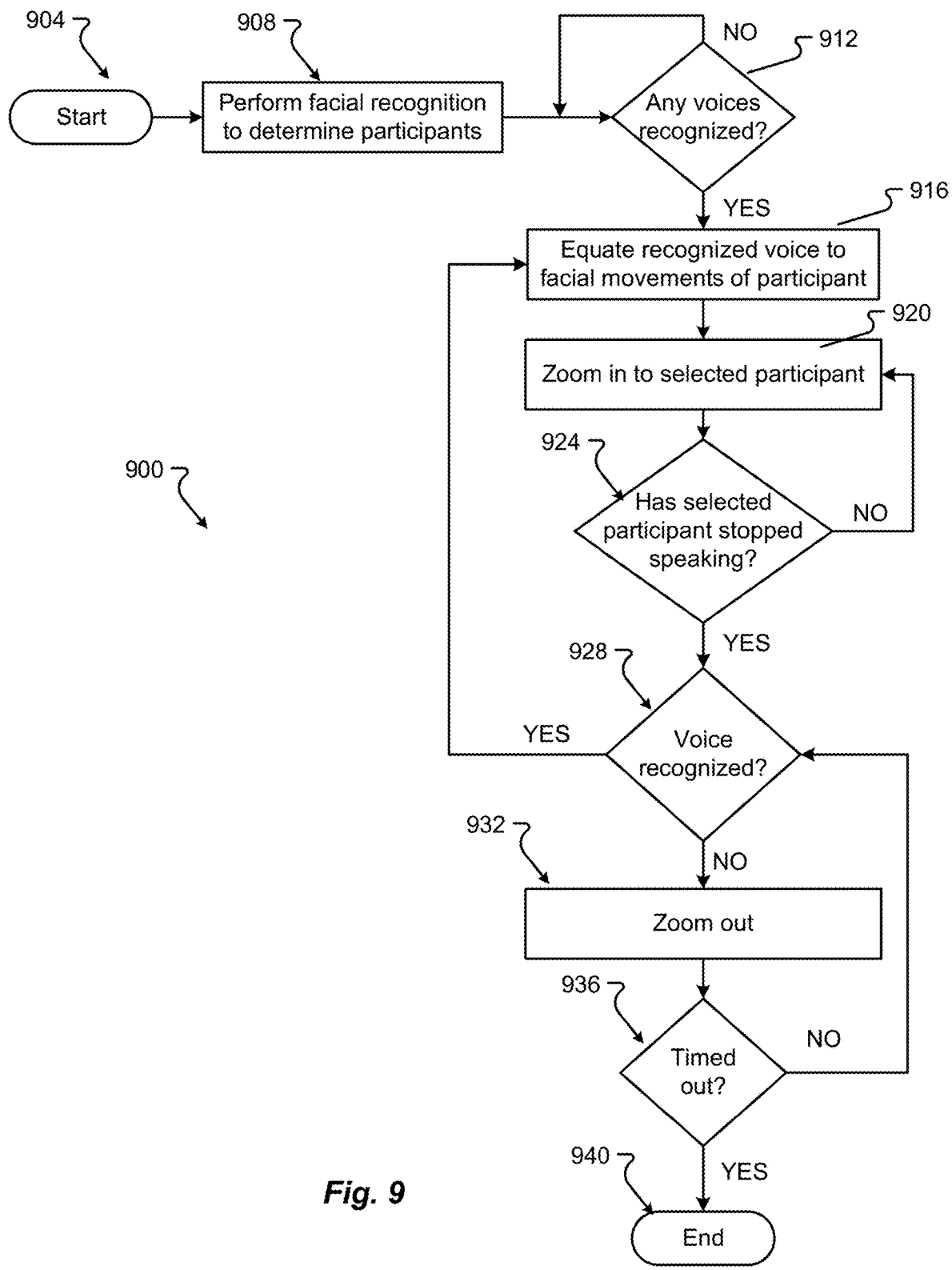
FIG. 9 is a flow diagram of a method used for auto focusing on a speaker during a communication session according to embodiments of the present disclosure.

FIG. 9 is a flow diagram of a method 900 used for auto focusing on a speaker during a communication session according to embodiments of the present disclosure. While a general order of the steps of method 900 is shown in FIG. 9, method 900 can include more or fewer steps or can arrange the order of the steps differently than those shown in FIG. 9. Further, two or more steps may be combined into one step. Generally, method 900 starts with a START operation at step 904 and ends with an END operation at step 940. Method 900 can be executed as a set of computer-executable instructions executed by a data-processing system and encoded or stored on a computer readable medium. Hereinafter, method 900 shall be explained with reference to the systems, the components, the modules, the software, the data structures, the user interfaces, etc. described in conjunction with FIGS. 1-8.

Method 900 starts with the START operation at step 904 and proceeds to step 908, where the processor 270, the video analyzer 245 and the artificial intelligence module 275 of the conferencing server 244 perform facial recognition to determine the participants to the communication session. According to embodiments of the present disclosure, the participants to the communication session would previously register facial and voice prints with the conferencing server 244. The registration of the facial and voice prints can occur just before the communication session begins or the registered facial and voice prints can be entered well in advance and retrieved from the registration module 247 or the database 246. According to a further embodiment of the present disclosure, a participant would simply enter a user ID. The user ID would automatically associate the participant with a registered facial and voice prints without use of the audio analyzer 243, the video analyzer 245 and the artificial intelligence module 275. Facial recognition would, however, be used to determine a seating arrangement of the participants to the communication session. Before the communication session begins (e.g., before the participants start speaking) an image of all of the participants to the communication session is displayed as illustrated in FIG. 5.

After facial recognition is performed to determine the participants to the communication session at step 908, method 900 proceeds to decision step 912, where the processor 270, the audio analyzer 243 and the artificial intelligence module 275 of the conferencing server 244 determine if a voice from any of the participants to the communication session can be recognized. If no voice from the participant to the communication session can be recognized (NO) at decision step 912, method 900 returns to decision step 912. At this point, the image does not change and an image of all of the participants to the communication session is displayed.

If a voice from any of the participants to the communication session is recognized (YES) at decision step 912, method 900 proceeds to step 916, where the processor 270, the audio analyzer 243, the video analyzer 245 and the artificial intelligence module 275 of the conferencing server 244 are used to equate the recognized voice to facial movements of the participant. According to embodiments of the present disclosure, the recognized voice is equated to the facial movements of the participant by detecting the movement of the participant's mouth as the participant faces the camera. According to an alternative embodiment of the present disclosure, the video analyzer 245 along with the artificial intelligence module 275 can first detect the movement of a participant's mouth as the participant faces the camera to recognize that one of the participants to the communication session wants to speak. Afterwards, the recognized participant is equated to the detected voice information of the participant by comparing the participant's voice information with the registered voice print of the participant.

After equating the recognized voice to facial movements of the participant at step 916, method 900 proceeds to step 920, where the processor 270 and the video analyzer 245 of the conferencing server 244 zoom in on the selected participant as the active speaker. According to embodiments of the present disclosure, zooming in on the selected participant also filters out the image and voice information of the non-speaking participants to the communication session. After zooming in on the selected participant as the active speaker at step 920, method 900 proceeds to decision step 924, where the processor 270, the audio analyzer 243, the video analyzer 245 and the artificial intelligence module 275 of the conferencing server 244 determine if the selected participant has stopped speaking. If the selected participant has not stopped speaking (NO) at decision step 924, method 900 returns to step 920 where the zoomed in image of the selected participant is maintained. If the selected participant has stopped speaking (YES) at decision step 924, method 900 proceeds to decision step 928, where the processor 270, the audio analyzer 243 and the artificial intelligence module 275 of the conferencing server 244 determine if any voice is recognized from the participants to the communication session. If a voice is recognized (YES) at step 918, method 900 returns to step 916 where the processor 270, the audio analyzer 243, the video analyzer 245 and the artificial intelligence module 275 of the conferencing server 244 are used to equate the recognized voice to facial movements of the participant. If no voice is recognized (NO) at decision step 928, method 900 proceeds to step 932, where the processor 270, the audio analyzer 243, the video analyzer 245 and the artificial intelligence module 275 of the conferencing server 244 zoom out on the selected participant and an image of all of the participants to the communication session are displayed. After zooming out on the selected participant and displaying an image of all of the participants to the communication session, method 900 proceeds to decision step 936, where the processor 270 and the memory 250 of the conferencing server 244 determine if the time for the communication session has expired. If the time for the communication session has not expired (NO) at decision step 936, method 900 returns to decision step 928, where the processor 270, the audio analyzer 243 and the artificial intelligence module 275 of the conferencing server 244 determine if any voice is recognized from the participants to the communication session. If the time for the communication session has expired (YES) at decision step 936, method 900 ends with END operation at step 940.

The exemplary systems and methods of this disclosure have been described in relation to a distributed processing network. However, to avoid unnecessarily obscuring the present disclosure, the preceding description omits a number of known structures and devices. This omission is not to be construed as a limitation of the scopes of the claims. Specific details are set forth to provide an understanding of the present disclosure. It should however be appreciated that the present disclosure may be practiced in a variety of ways beyond the specific detail set forth herein.

Furthermore, while the exemplary aspects, embodiments and/or configurations illustrated herein show the various components of the system collocated, certain components of the system can be located remotely, at distant portions of a distributed network, such as a LAN and/or the Internet or within a dedicated system. Thus, it should be appreciated, that the components of the system can be combined in to one or more devices, such as a server or collocated on a particular node of a distributed network, such as an analog and/or digital communications network, a packet-switch network or a circuit-switched network. It will be appreciated from the preceding description and for reasons of computational efficiency, that the components of the system can be arranged at any location within a distributed network of components without affecting the operation of the system. For example, the various components can be located in a switch such as a Privat Branch Exchange (PBX) and media server, gateway, in one or more communications devices, at one or more users' premises or some combination thereof. Similarly, one or more functional portions of the system could be distributed between a communications device(s) and an associated computing device.

Furthermore, it should be appreciated that the various links connecting the elements can be wired or wireless links, or any combination thereof or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics and may take the form of acoustic or light waves, such as those generated during radio-wave and infrared data communications.

Also, while the flowcharts have been discussed and illustrated in relation to a particular sequence of events, it should be appreciated that changes, additions and omissions to this sequence can occur without materially affecting the operation of the disclosed embodiments, configuration and aspects.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as Programmable Logic Device (PLD), Programmable Logic Array (PLA), Field Programmable Gate Array (FPGA), Programmable Array Logic (PAL) special purpose computer, any comparable means or the like. In general, any device(s) or means capable of implementing the methodology illustrated herein can be used to implement the various aspects of this disclosure. Exemplary hardware that can be used for the disclosed embodiments, configurations and aspects includes computers, handheld devices, telephones (e.g., cellular, Internet enabled, digital, analog, hybrids and others), and other hardware known in the art. Some of these devices include processors (e.g., a single or multiple microprocessors), memory, nonvolatile storage, input devices and output devices. Furthermore, alternative software implementations including, but not limited to, distributed processing or component/object distributed processing, parallel processing or virtual machine processing can also be constructed to implement the methods described herein.

In yet another embodiment, the disclosed methods may be readily implemented in conjunction with software using object or object-oriented software development locations that provide portable source code that can be used on a variety of computer or workstation platforms. Alternatively, the disclosed system may be implemented partially or fully in hardware using standard logic circuits or Very Large-scale Integration (VLSI) design. Whether software or hardware is used to implement the systems in accordance with this disclosure is dependent on the speed and/or efficiency requirements of the system, the particular function and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor or the like. In these instances, the systems and methods of this disclosure can be implemented as program embedded on personal computer such as an applet, JAVA® or Computer-generated Imagery (CGI) script, as a resource residing on a server or computer workstation, as a routine embedded in a dedicated measurement system, system component or the like. The system can also be implemented by physically incorporating the system and/or method into a software and/or hardware system.

Although the present disclosure describes components and functions implemented in the aspects, embodiments and/or configurations with reference to particular standards and protocols, the aspects, embodiments and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various aspects, embodiments and/or configurations, includes components, methods, processes, systems and/or apparatus substantially as depicted and described herein, including various aspects, embodiments, configurations embodiments, sub combinations and/or subsets thereof. Those of skill in the art will understand how to make and use the disclosed aspects, embodiments and/or configurations after understanding the present disclosure. The present disclosure, in various aspects, embodiments and/or configurations, includes providing devices and processes in the absence of items not depicted and/or described herein or in various aspects, embodiments and/or configurations hereof, including in the absence of such items as may have been used in previous devices or processes, e.g., for improving performance, achieving ease and\or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments and/or configurations for the purpose of streamlining the disclosure. The features of the aspects, embodiments and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment and/or configuration. Thus, the following claims are hereby incorporated into this Detailed Description, with each claim standing on its own as a separate preferred embodiment of the disclosure.

Moreover, though the description has included description of one or more aspects, embodiments and/or configurations and certain variations and modifications, other variations, combinations and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein and without intending to publicly dedicate any patentable subject matter.

Embodiments of the present disclosure include a method for auto focus on a speaker during a communication session including receiving video captured of a scene that includes a plurality of images of participants to a communication session, identifying the plurality of images of the participants in the video captured of the scene, recognizing audio from at least one of the participants to the communication session and detecting facial movement in one of the images of the plurality of images. The method also includes equating the recognized audio to the detected movement in the one of the images of the plurality of images, selecting the one of the images of the plurality of images as a speaker based on the equated recognized audio to the detected movement in the one of the images of the plurality of images, zooming in on the speaker and filtering out a remainder of the images of the plurality of images.

Aspects of the above method include wherein the communication session is a conference call.

Aspects of the above method include wherein identifying the plurality of images of the participants includes performing image recognition on the video to identify the plurality of images of the participants.

Aspects of the above method include wherein recognizing the audio from at least one of the participants to the communication session includes performing voice recognition to recognize the audio from at least one of the images.

Aspects of the above method include wherein detecting the facial movement in the one of the images of the plurality of images includes performing image recognition to detect the facial movement in the one of the images of the plurality of images.

Aspects of the above method further include filtering out audio from other participants to the communication session after zooming in on the speaker.

Aspects of the above method further include zooming out on the speaker after not recognizing any audio from at least one of the participants to the communication session.

Aspects of the above method further include comparing the recognized audio from at least one of the participants to the communication session with a registered voice print of the audio from at least one of the images of the plurality of images.

Aspects of the above method further include comparing the identified plurality of images of the participants with registered facial prints for the plurality of images of the participants.

Embodiments of the present disclosure include a system for auto focus on a speaker during a communication session including a processor and a memory coupled with and readable by the processor and having stored therein a set of instructions which, when executed by the processor, causes the processor to receive video captured of a scene that includes a plurality of images of participants to a communication session. The processor is further cause to identify the plurality of images of the participants in the video captured of the scene, recognize audio from at least one of the participants to the communication session, detect facial movement in one of the images of the plurality of images and equate the recognized audio to the detected movement in the one of the images of the plurality of images. Also, the processor is further caused to select the one of the images of the plurality of images as a speaker based on the equated recognized audio to the detected movement in the one of the images of the plurality of images, zoom in on the speaker and filter out a remainder of the images of the plurality of images.

Aspects of the above system include wherein the communication session is a conference call.

Aspects of the above system include wherein the processor is further caused to perform image recognition on the video to identify the plurality of images of the participants.

Aspects of the above system include wherein the processor is further caused to perform voice recognition to recognize the audio from at least one of the participants to the communication session.

Aspects of the above system include wherein the processor is further caused to filter out audio from other participants to the communication session after zooming in on the speaker.

Aspects of the above system include wherein the processor is further caused to zoom out on the speaker after not recognizing any audio from at least one of the participants to the communication session.

Embodiments of the present disclosure include computer readable medium including microprocessor executable instructions that, when executed by the microprocessor, perform the functions of receive video captured of a scene that includes a plurality of images of participants to a communication session, identify the plurality of images of the participants in the video captured of the scene, recognize audio from at least one of the participants to the communication session, detect facial movement in one of the images of the plurality of images and equate the recognized audio to the detected movement in the one of the images of the plurality of images. The microprocessor further performs the function of select the one of the images of the plurality of images as a speaker based on the equated recognized audio to the detected movement in the one of the images of the plurality of images, zoom in on the speaker and filter out a remainder of the images of the plurality of images.

Aspects of the above computer readable medium include wherein the communication session is a conference call.

Aspects of the above computer readable medium include wherein the microprocessor further performs the function of perform image recognition on the video to identify the plurality of images of the participants.

Aspects of the above computer readable medium include wherein the microprocessor further performs the function of filter out audio from other participants to the communication session after zooming in on the speaker.

Aspects of the above computer readable medium include wherein the microprocessor further performs the function of zoom out on the speaker after not recognizing any audio from at least one of the participants to the communication session.

What is claimed is:

1. A method, comprising:
   receiving video captured of a scene that includes a plurality of images of participants to a communication session;
   identifying the plurality of images of the participants in the video captured of the scene based on registered facial prints;

recognizing audio from at least one of the participants to the communication session based on registered voice prints;
detecting facial movement in one of the images of the plurality of images using artificial intelligence;
equating the recognized audio to the detected facial movement in the one of the images of the plurality of images using artificial intelligence;
selecting the one of the images of the plurality of images as a speaker based on the equated recognized audio to the detected facial movement in the one of the images of the plurality of images and the registered facial prints and voice prints;
zooming in on the speaker; and
filtering out a remainder of the images of the plurality of images.

2. The method according to claim 1, wherein the communication session is a conference call.

3. The method according to claim 1, wherein identifying the plurality of images of the participants includes performing image recognition on the video to identify the plurality of images of the participants.

4. The method according to claim 1, wherein recognizing the audio from at least one of the participants to the communication session includes performing voice recognition to recognize the audio from at least one of the images.

5. The method according to claim 1, wherein detecting the facial movement in the one of the images of the plurality of images includes performing image recognition to detect the facial movement in the one of the images of the plurality of images.

6. The method according to claim 1, further comprising filtering out audio from other the participants to the communication session after zooming in on the speaker.

7. The method according to claim 1, further comprising zooming out on the speaker after not recognizing any audio from at least one of the participants to the communication session.

8. The method according to claim 1, further comprising selecting two of the images of the plurality of images as two speakers based on the equated recognized audio to the detected facial movement in the two of the images of the plurality of images and the registered facial prints and voice prints and zooming in on the two speakers.

9. A system, comprising:
a processor; and
a memory coupled with and readable by the processor and having stored therein a set of instructions which, when executed by the processor, causes the processor to:
receive video captured of a scene that includes a plurality of images of participants to a communication session;
identify the plurality of images of the participants in the video captured of the scene based on registered facial prints;
recognize audio from at least one of the participants to the communication session based on registered voice prints;
detect facial movement in one of the images of the plurality of images using artificial intelligence;
equate the recognized audio to the detected facial movement in the one of the images of the plurality of images using artificial intelligence;
select the one of the images of the plurality of images as a speaker based on the equated recognized audio to the detected facial movement in the one of the images of the plurality of images and the registered facial prints and voice prints;
zoom in on the speaker; and
filter out a remainder of the images of the plurality of images.

10. The system according to claim 9, wherein the communication session is a conference call.

11. The system according to claim 9, wherein the instructions, when executed by the processor, further cause the processor to perform image recognition on the video to identify the plurality of images of the participants.

12. The system according to claim 9, wherein the instructions, when executed by the processor, further cause the processor to perform voice recognition to recognize the audio from at least one of the participants.

13. The system according to claim 9, wherein the instructions, when executed by the processor, further cause the processor to filter out audio from other participants to the communication session after zooming in on the speaker.

14. The system according to claim 9, wherein the instructions, when executed by the processor, further cause the processor to zoom out on the speaker after not recognizing any audio from at least one of the participants to the communication session.

15. The system according to claim 9, wherein the instructions, when executed by processor, further cause the processor to select two of the images of the plurality of images as two speakers based on the equated recognized audio to the detected facial movement in the two of the images of the plurality of images and the registered facial prints and voice prints and zoom in on the two speakers.

16. A non-transitory computer readable medium comprising microprocessor executable instructions that, when executed by the microprocessor, perform the following functions:
receive video captured of a scene that includes a plurality of images of participants to a communication session;
identify the plurality of images of the participants in the video captured of the scene based on registered facial prints;
recognize audio from at least one of the participants to the communication session based on registered voice prints;
detect facial movement in one of the images of the plurality of images using artificial intelligence;
equate the recognized audio to the detected facial movement in the one of the images of the plurality of images using artificial intelligence;
select the one of the images of the plurality of images as a speaker based on the equated recognized audio to the detected facial movement in the one of the images of the plurality of images and the registered facial prints and voice prints;
zoom in on the speaker; and
filter out a remainder of the images of the plurality of images.

17. The non-transitory computer readable medium according to claim 16, wherein the communication session is a conference call.

18. The non-transitory computer readable medium according to claim 16, wherein the instructions, when executed by the microprocessor, further perform the function of perform image recognition on the video to identify the plurality of images of the participants.

19. The non-transitory computer readable medium according to claim 16, wherein instructions, when executed by the microprocessor, further perform the function of filter out audio from other participants to the communication session after zooming in on the speaker.

20. The non-transitory computer readable medium according to claim 16, wherein instructions, when executed by the microprocessor, further perform the function of select two of the images of the plurality of images as two speakers based on the equated recognized audio to the detected facial movement in the two of the images of the plurality of images and the registered facial prints and voice prints and zoom in on the two speakers.

\* \* \* \* \*